UNITED STATES PATENT OFFICE.

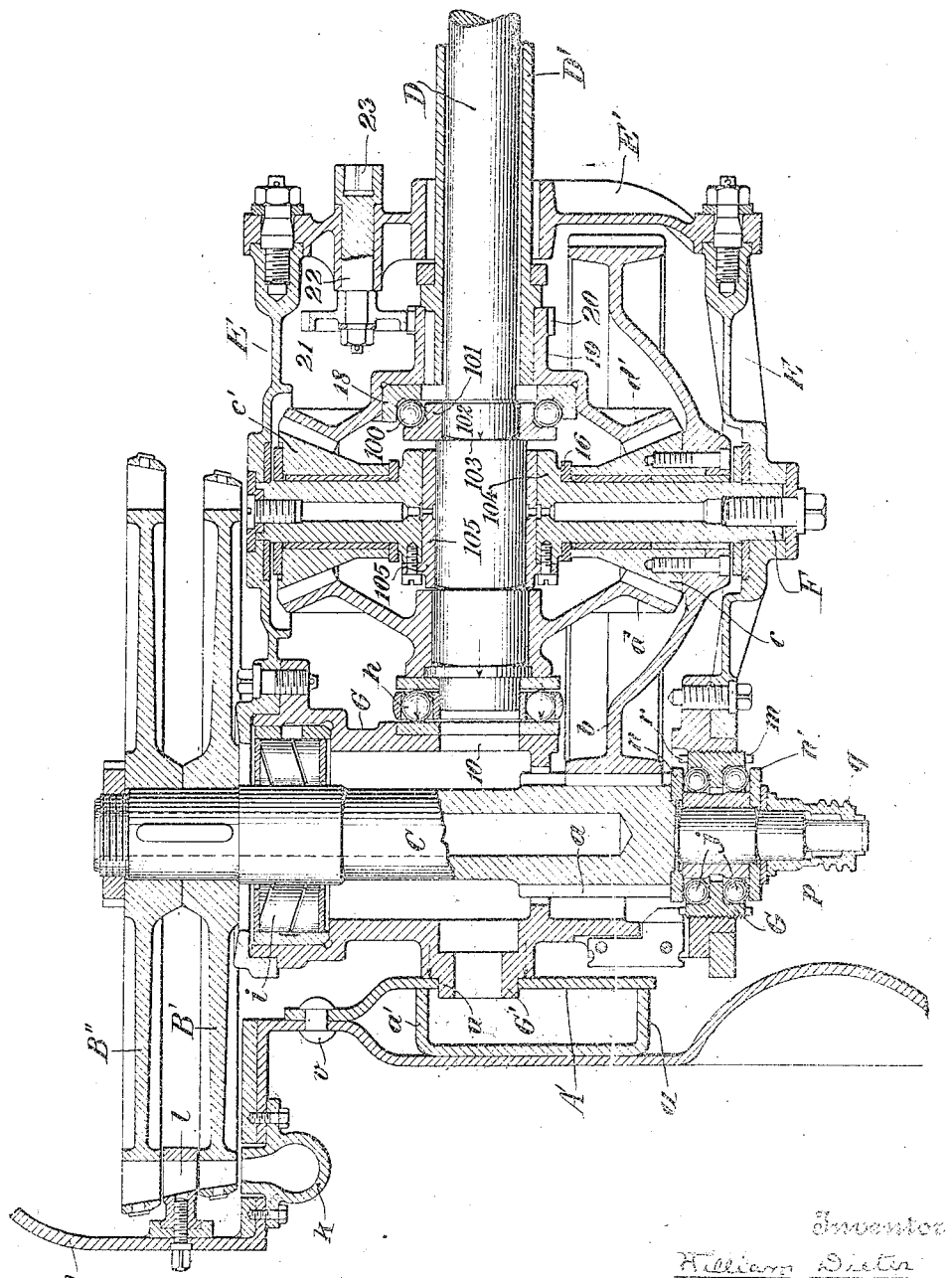

WILLIAM DIETER, OF BROOKLYN, NEW YORK.

PROPELLING MECHANISM FOR TORPEDOES.

1,407,262.  Specification of Letters Patent.  Patented Feb. 21, 1922.

Application filed January 17, 1921. Serial No. 437,728.

*To all whom it may concern:*

Be it known that I, WILLIAM DIETER, a citizen of the United States of America, residing in the borough of Brooklyn, county of Kings, city and State of New York, have invented certain new and useful Improvements in Propelling Mechanism for Torpedoes, of which the following is a specification.

This invention relates to propelling mechanism for torpedoes which have two propeller shafts, one within the other, a turbine or other motor, and gearing for communicating movement from the motor to the shafts so as to drive them in opposite directions. The object of the invention is to provide improved bearing means whereby better to take up the propulsive thrusts.

The accompanying drawing is a vertical, longitudinal mid-section of the driving mechanism.

The invention is shown as applied to a turbine-driven torpedo of the Bliss-Leavitt type. The particular construction shown, to which the present invention is applied, is that which is the subject of my application for patent Serial No. 340,358, filed November 24, 1919, to which reference may be made for a more full illustration and description of the parts which are not fully herein described.

Referring to the drawings, A designates the transverse bulkhead of the torpedo, which in general is of the usual known construction; B' and B'' are the primary and secondary turbine wheels; C is the turbine shaft; G is its tubular housing; D and D' are the respective propeller shafts, and E is the bearing frame for said shafts and for the transmission gearing.

The shaft C carries a pinion $a$ near its lower and, which pinion meshes with a gear wheel $b$ which carries a bevel pinion $c$ either fixed to it or formed integrally with it. This pinion meshes on opposite sides with bevel gears $d$ $d'$, the former being fixed on the shaft D and the latter being fixed on the shaft D', as heretofore. The gears $b$ $c$ turn on a stationary vertical shaft or crosshead F made fast at both ends in the frame E, thus constituting a part of this frame. Its lower portion forms a journal or bearing for the said gears $b$ $c$, and its upper portion is similarly formed as a journal or bearing for an idler bevel pinion $c'$, the sole function of which is to balance the pinion $c$ and cooperate therewith in maintaining the gears $d$ $d'$ in unison in their opposite rotation. A thrust bearing $h$ is provided for taking up the end thrusts of the propeller shaft D.

The turbine shaft C is mounted at its upper end in a roller bearing $i$, and at its lower end in a double ball bearing $j$, the outer stationary raceways of which are held in the tubular housing G which encloses the shaft C and is fastened at top and bottom to the upper and lower members of the frame E. This housing has a projection or boss G' on its forward side which bears against a plate A' riveted to the bulkhead A, the latter having a reinforcing plate with upturned flanges $a'$ which transmit the thrust from the boss G'. This boss is centered by having a reduced projection $u$ entering hole in the plate A'.

So far as described, the parts are the same as those of my aforesaid application (except that the bearing $i$ is a roller bearing instead of a ball bearing), and are, for convenience, designated by the same letters of reference.

The present invention will now be described. Heretofore the outer shaft D' has been provided at its forward end with a bearing supported on the crosshead F of the frame, so that the thrust of the outer shaft has been transmitted through this bearing to such crosshead, and thence through the upper and lower frame members and their connections to the transverse bulkhead. In my aforesaid application this bearing was a ball bearing $e'$ formed within the bevel gear $d'$ carrying the outer ball race, while the inner ball race was constructed as a sleeve seating on the central hub of the crosshead F.

According to the present invention, this construction is changed in such manner that the thrust of the outer propeller shaft is transmitted to the inner propeller shaft at the bearing which supports the forward end of the outer shaft. This bearing, here lettered 100, being preferably a ball bearing, has its outer race 18 carried within the bevel gear wheel $d'$ as heretofore, while its inner race 101 is formed as a ring fitting on a portion 102 of the inner shaft and seating against a shoulder 103 thereof, so that the thrust transmitted from the outer shaft through the balls and inner race is received by this shoulder 103, and is thence transmitted through the inner shaft to the thrust bearing $h$. and thence through the housing G to the bulkhead. To accomplish this resuit the hub 104 of the crosshead F, through which hub the shaft D passes, is cut back sufficiently to leave a clearance between it and the race ring 101.

The shaft D is shown as having a bearing 105 within the hub 104, this bearing serving to center the shaft, but without receiving any end thrust.

The present invention involves several advantages. It being understood that torpedo shafts and their mountings revolve at high speed and are necessarily of light construction, it will be apparent that with the old construction, where the propulsive thrust was transmitted from the outer shaft through its bearing to the hub 104 of the crosshead F, that this thrust subjected this crosshead to a severe lateral strain. The present improvement relieves this crosshead of this strain, and also takes all propulsive strains from the upper and lower members of the frame E and from the ends of the housing G, and concentrates all thrusts as nearly as possible in line with the axis of the shafts, that is to say, through the thrust bearing $h$ and the thrust bearing boss G', the direction of these thrusts being shown by the small arrows in the drawing. With the old construction it was found that at high speed there was a whipping of the shafts, whereby considerable noise or chattering was caused, accompanied probably by some loss of power. The improved construction eliminates this noise, so that the engine runs silently. It further has the effect of rendering the transmission more direct and efficient, and reducing the wear of the parts.

The pinion or gear teeth heretofore formed on the outer propeller shaft, are transferred to the hub 19 of the gear $d'$ which is keyed on this shaft in the usual manner. These pinion teeth are shown at 20 meshing with the gear 21 which is fixed on a shaft 22 and terminates in a coupling socket 23 for engagement with the spindle which drives the distance gear or counting down mechanism, in the usual manner. The gear teeth 20 and the gear 21 are thus transferred to a position inside the frame where they are better protected, while the necessity of cutting gear teeth on the shaft D' is avoided.

The invention may be embodied in other ways than by the specific construction shown, as will be apparent.

I claim as my invention:—

1. In a torpedo having inner and outer propeller shafts, a motor, and gearing for driving the shafts in opposite directions, a bulkhead, a thrust bearing transmitting end thrust from the inner shaft to said bulkhead, and a thrust bearing for the outer shaft carried by the inner shaft, so that the propulsive thrust of the outer shaft is transmitted to and through the inner shaft to said bulkhead.

2. In a torpedo having inner and outer propeller shafts, a motor, gearing for driving the shafts in opposite directions, and framework having bearings for said motor, gearing and shafts, a thrust bearing for the outer shaft located within said gearing and carried by the inner shaft, so that the thrust of the outer shaft is transmitted to and through the inner shaft.

3. In a torpedo having inner and outer propeller shafts, a motor, a pinion driven by the motor, a gear driven by said pinion and carrying a bevel pinion, bevel gears meshing with said bevel pinion and fixed on the respective propeller shafts to drive them in opposite directions, and a frame affording bearings for said parts, with a thrust bearing for the outer shaft carried against a shoulder on the inner shaft, whereby the thrust of the outer shaft is transmitted through such bearing and shoulder to the inner shaft.

4. In a torpedo having a transverse bulkhead, a bearing frame having a thrust bearing engagement with said bulkhead, a motor on a shaft having bearings in said frame, inner and outer propeller shafts, gearing transmitting movement from said motor shaft to drive said propeller shafts in opposite directions, said propeller shafts and gearing having bearings in said frame, and said frame including a transverse portion having a central bearing for the inner shaft, a thrust bearing for the outer shaft carried by the inner shaft, so that the thrust of the outer shaft is transmitted through the inner shaft and through the members of said frame in a direct line to the bearing engagement thereof with said bulkhead.

In witness whereof, I have hereunto signed my name.

WILLIAM DIETER.